A. CHRISTIANSEN.
AUTOMOBILE POWER MECHANISM.
APPLICATION FILED DEC. 11, 1917.

1,264,488.  Patented Apr. 30, 1918.

Witnesses

Inventor
A. Christiansen
By Chandler & Chandler
Attorney

UNITED STATES PATENT OFFICE.

ALFRED CHRISTIANSEN, OF EVERETT, WASHINGTON.

AUTOMOBILE POWER MECHANISM.

1,264,488.

Specification of Letters Patent. Patented Apr. 30, 1918.

Application filed December 11, 1917. Serial No. 206,658.

*To all whom it may concern:*

Be it known that I, ALFRED CHRISTIANSEN, a citizen of the United States, residing at Everett, in the county of Snohomish, State of Washington, have invented certain new and useful Improvements in Automobile Power Mechanisms; and I do hereby declare the following to be a full, clear, and exact description of the invention, such as will enable others skilled in the art to which it appertains to make and use the same.

This invention relates to improvements in power mechanisms, and particularly to mechanisms for obtaining power from automobiles.

One object of the present invention is to provide a novel and simple device for utilizing the power of an automobile, especially on a farm, for driving such devices as churns, grain grinding machines, shelling machines, wood sawing machines, or other devices where the expense of an engine is required.

Another object is to improve the construction of devices of this character whereby the automobile can be quickly and easily placed thereon and held in such position that the maximum of power from the rear wheels of the automobile can be utilized for the purposes desired.

Other objects and advantages will be apparent from the following description when taken in connection with the accompanying drawing.

Figure 1:
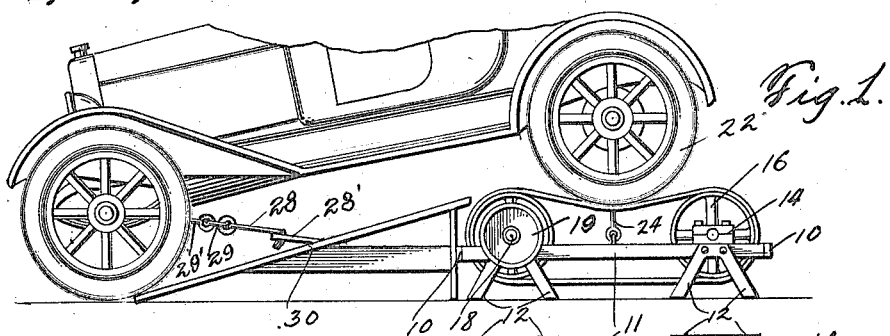
Figure 1 is a side elevation of my improved power mechanism showing an automobile thereon.
Figure 2:
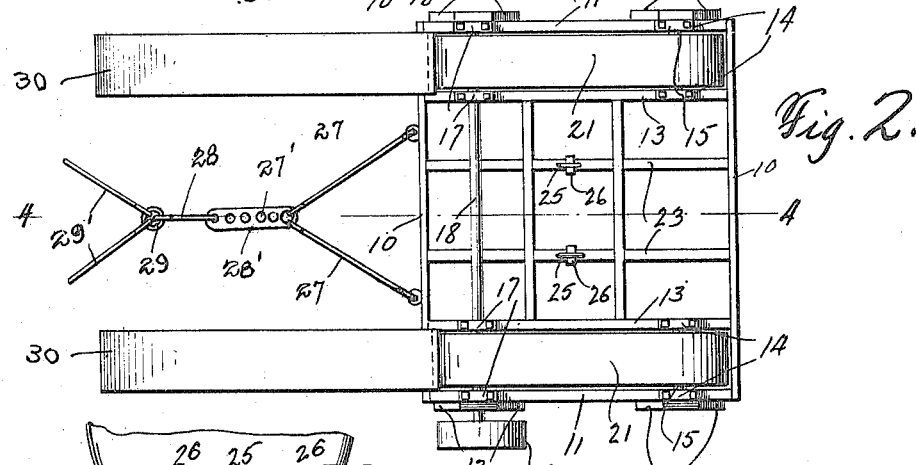
Fig. 2 is a top plan view of the device, the automobile being removed.
Figure 3:
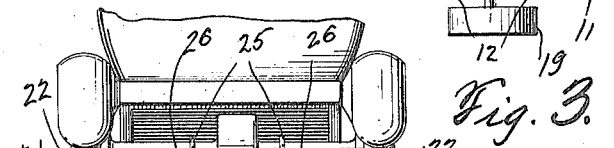
Fig. 3 is a rear elevation of the device with the automobile thereon.
Figure 4:
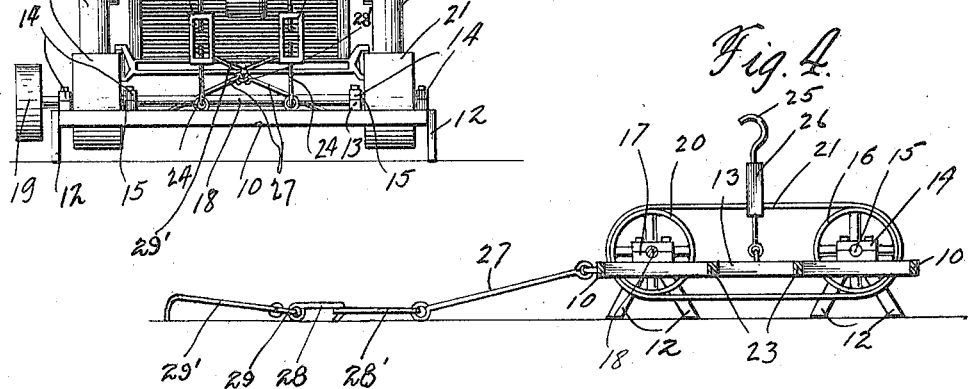
Fig. 4 is a sectional view taken on the line 4—4 of Fig. 2.

Referring particularly to the accompanying drawing, there is shown a frame which includes the longer side members 10, to which are connected the shorter end members 11. These members are supported by the legs 12, whereby the frame is elevated the proper distance above the floor or ground. Secured to the longer members 10, and disposed in parallel relation to the end members 11, are the inwardly arranged members 13. Boxings 14 are carried by the members 11 and 13, and in these boxings are supported the shorter shafts 15. On each of these shafts there is mounted a large belt wheel 16. Boxings 17 are mounted on the members 11 and 13, adjacent the other ends of said members, and supported in these boxings is a shaft 18 which extends the entire length of the frame, one end of said shaft extending beyond one end and being provided with a belt pulley 19 from which the power is transmitted to the machinery to be driven. Carried by the shaft 18, between the members 11 and 13, are the belt wheels 20, and engaged around these wheels and the wheels 16 are the wide belts 21 on which the rear wheels 22 of the automobile are rested when the power mechanism is in operation.

Disposed in the frame, and arranged in parallel relation to the ends thereof, are the members 23, and disposed vertically through the intermediate portions of said members are the bolts 24 which are connected to the hook members 25 by means of the turnbuckles 26. The hooks are adapted to be engaged over the rear axle of the automobile when the automobile is disposed on the belts 21.

Connected to the forward end of the device are the rods 27, the same being disposed in forwardly convergent relation and secured in the rearmost of the series of openings 27' of a plate 28'. Arranged for interchangeable engagement in the said openings is a hook member 28 which is connected to a ring 29, a pair of hooks 29' being also connected to the ring and arranged to be engaged with the front axle of the automobile. By this adjustable means the device is capable of attachment to automobiles of different lengths.

An inclined skid 30 is arranged to be pushed up against one of the longer sides of the frame, and up this skid the automobile is arranged to be backed to place the rear wheels on the belts 21.

From the foregoing it will be seen that when the automobile is disposed on the belts 21, the hooks 25 engaged with the rear axle of the automobile, and the hooks 29' engaged with the front axle, and the engine started, the rotation of the rear wheels will drive the belts 21 with the result that the shaft 18 will be driven so that power can be transmitted from said shaft to the machinery to be driven.

While I have shown the front wheels of the automobile resting on the ground, it will be understood that with some automobiles the running board will not permit this arrangement, thereby making it necessary to lengthen the skid so that the front wheels will rest on the skid and elevate the running board out of contact with the upper end of the skid and the adjacent side of the frame. This, of course, is clearly within the spirit of the invention and the scope of the appended claims.

What is claimed is:

1. A power mechanism for automobiles including a frame, power belts for supporting the rear wheels of the automobile, means on the frame for adjustable connection with the rear axle of the automobile, and means carried by the frame for attachment to the front axle of the automobile.

2. A power mechanism for an automobile including a frame, shafts in the frame, belt wheels mounted on the shafts and rotatable therewith, belts engaged around the belt wheels for supporting the traction wheels of the automobile, a skid for facilitating the positioning of the automobile wheels on the belts, adjustable bolts carried by the frame and provided with hooks for engagement with the rear axle of the automobile, rods carried by the frame and provided with hooks for engagement with the front axle of the automobile, for holding the automobile in proper position.

3. A power mechanism for an automobile including a frame, means for supporting the rear wheels of an automobile and arranged to be driven thereby, means on the frame for engagement with the rear axle of the automobile, and adjustable means for engagement with the front axle of the automobile.

4. A power mechanism for an automobile including a frame, means for supporting the rear wheels of an automobile and arranged to be driven thereby, adjustable means carried by the frame for attachment to the rear axle of the automobile, a member having a series of openings, links connecting the member with the frame, and means for engagement with the front axle of the automobile and arranged for interchangeable engagement in said openings.

In testimony whereof, I affix my signature in the presence of two witnesses.

ALFRED CHRISTIANSEN.

Witnesses:
ALFRED E. SHOLBERG,
D. W. LOCKE.